United States Patent [19]

Lerner et al.

[11] Patent Number: 4,731,545
[45] Date of Patent: Mar. 15, 1988

[54] PORTABLE SELF-CONTAINED POWER CONVERSION UNIT

[75] Inventors: Hal Lerner; Bhikhabhai J. Desai; Suresh B. Desai, all of Huntington Park, Calif.

[73] Assignee: Desai & Lerner, Huntington Park, Calif.

[21] Appl. No.: 840,430

[22] Filed: Mar. 14, 1986

[51] Int. Cl.⁴ .......................... H02P 9/04; F03D 9/00; F03B 13/00
[52] U.S. Cl. ..................................... 290/54; 290/43; 416/185; 416/197 A; 416/197 B; 417/348; 340/320; 322/35
[58] Field of Search ....................... 290/53, 42, 54, 43, 290/52; 416/197 A, 197 B, 185, 187, 188, 158; 417/348, 349; 415/80, 87; 340/320; 322/35

[56] References Cited

U.S. PATENT DOCUMENTS

| 96,573 | 11/1869 | Andrews | 416/197 B |
|---|---|---|---|
| 2,276,714 | 3/1942 | Brown | 290/54 |
| 2,436,683 | 2/1948 | Wood, Jr. | 290/54 |
| 3,750,001 | 7/1973 | McCloskey | 320/61 |
| 3,845,291 | 10/1974 | Portyrata | 240/26 |
| 4,142,367 | 3/1979 | Guisti | 60/325 |
| 4,182,123 | 1/1980 | Ueda | 290/54 X |
| 4,272,685 | 6/1981 | Toyama | 290/52 |
| 4,352,025 | 9/1982 | Troyen | 290/54 |
| 4,392,063 | 7/1983 | Lindquist | 290/54 |
| 4,488,055 | 12/1984 | Toyama | 290/53 |

Primary Examiner—William M. Shoop, Jr.
Assistant Examiner—Sharon D. Logan
Attorney, Agent, or Firm—Lyon & Lyon

[57] ABSTRACT

A portable, self-contained power conversion unit is disclosed that is attached to an outlet for a pressurized fluid system, such as the nozzle for a garden hose. An impeller mounted in the body of the unit and is rotated by the discharge of pressurized fluid through the unit. The rotational energy of the impeller is converted into electrical energy by a generator, and/or used directly in rotating tools attached to the impeller, such as grinding wheels, rotary saws, rotary brushes, drill bits, and the like.

17 Claims, 5 Drawing Figures

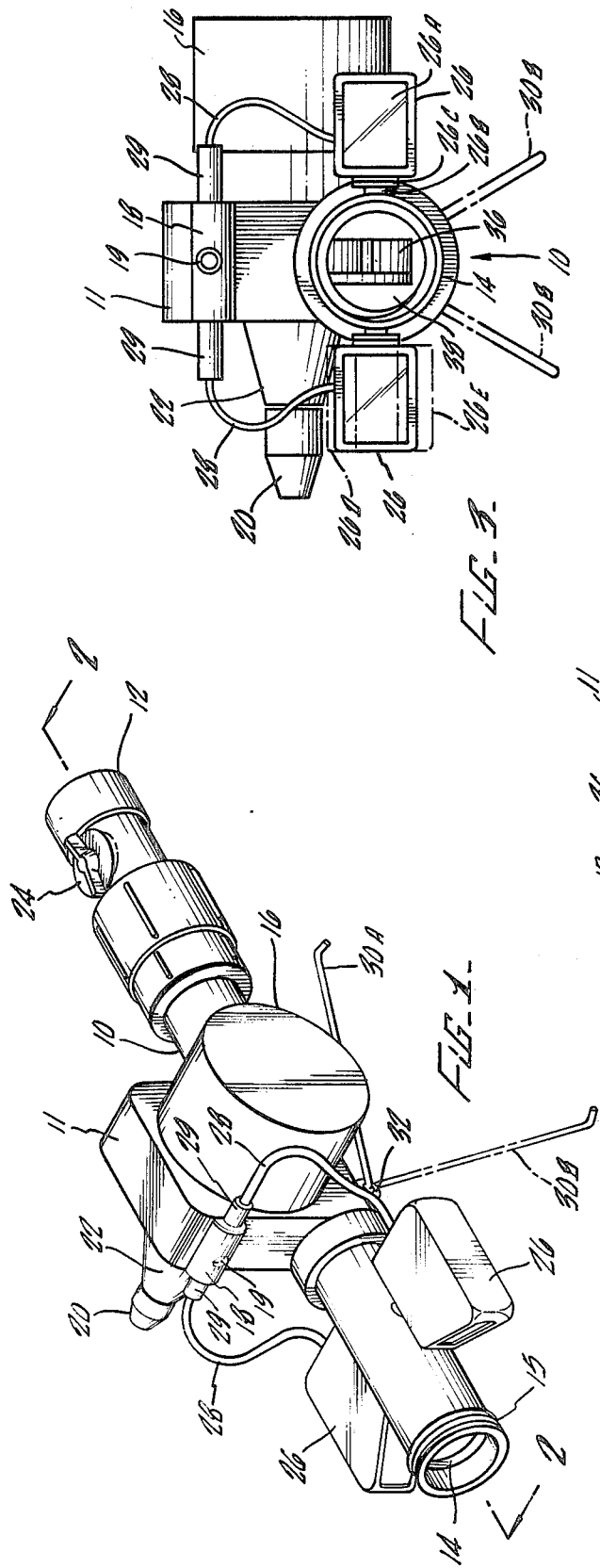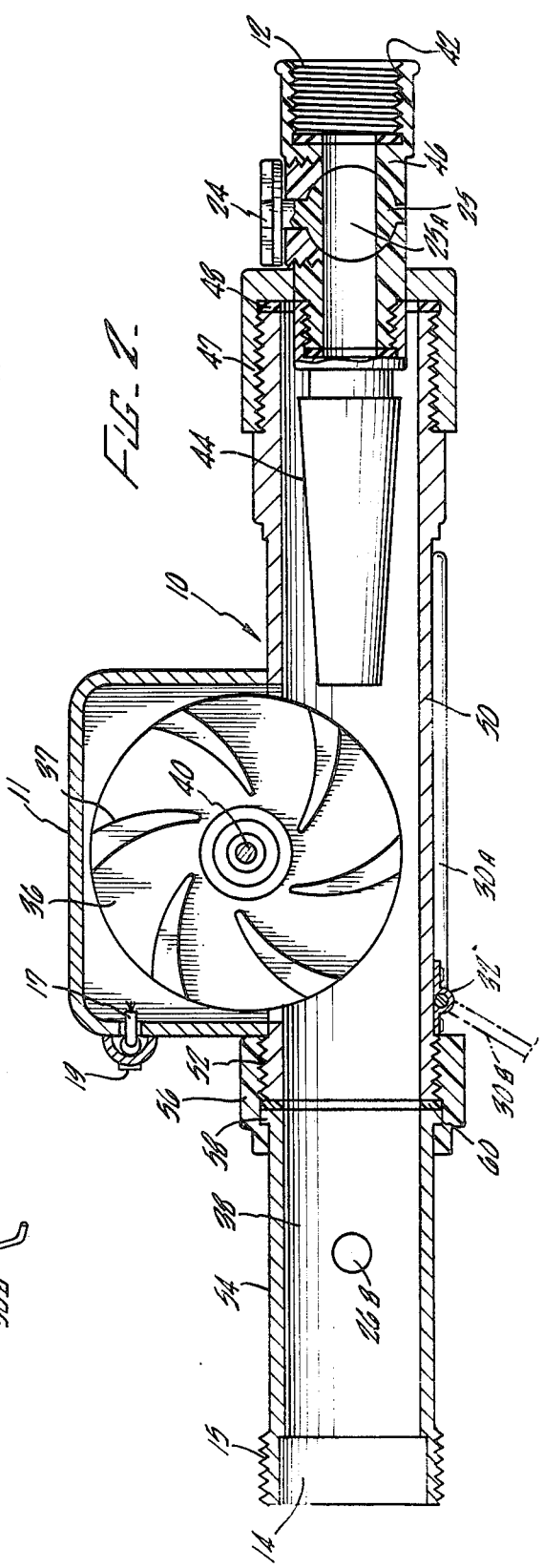

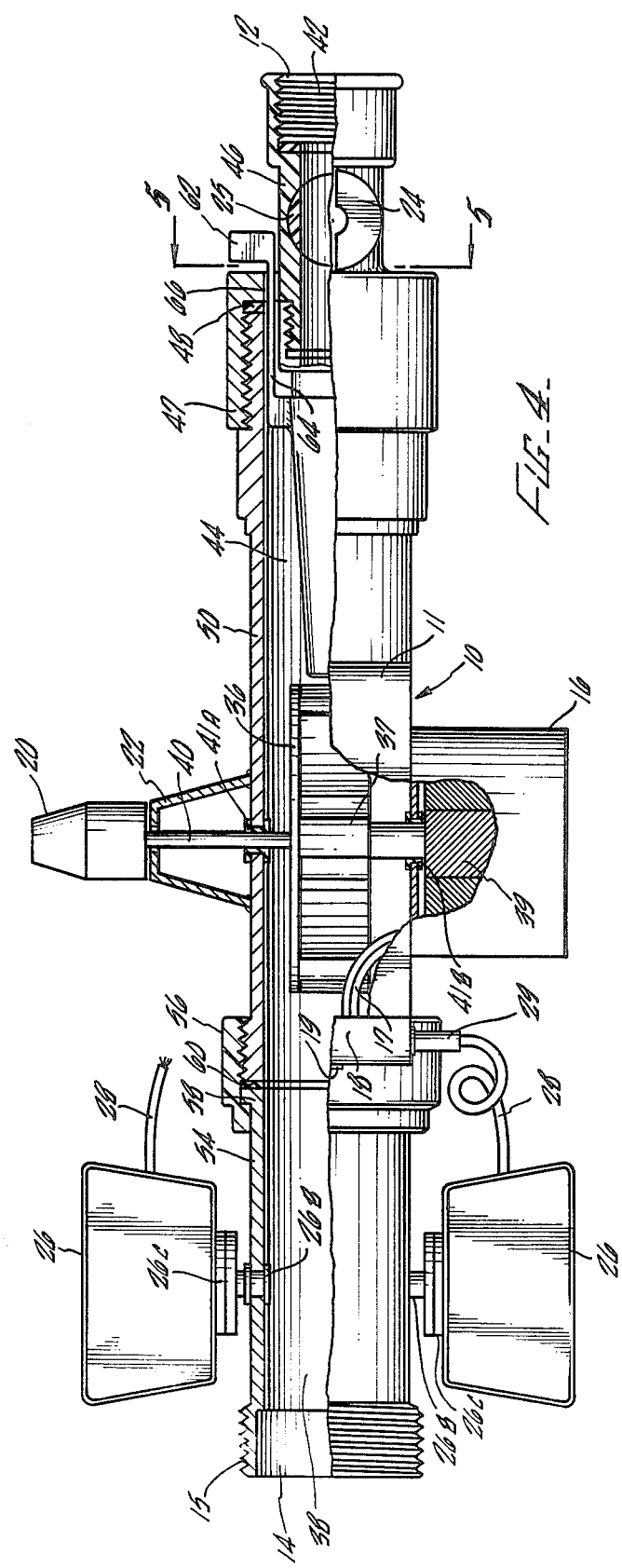
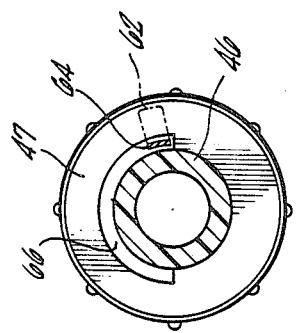

PORTABLE SELF-CONTAINED POWER CONVERSION UNIT

BACKGROUND OF THE INVENTION

1. Field of the Invention

The field of the invention is that of devices which convert the energy of pressurized fluid into other, more useful, forms of energy, and particularly portable energy-conversion devices which attach to outlets of pressurized fluid supply systems.

2. Description of the Prior Art

Sources of pressurized fluid are commonly available. Important examples are the water supply systems found in modern households and cities, the water mains systems supplying fire hydrants, and farm irrigation systems that operate on the basis of natural artesian pressure or pump-supplied pressure. The difference between the fluid's pressure and ambient atmospheric pressure indicates that a difference in potential energy exists. This difference in potential energy can be converted into kinetic energy when the pressurized fluid is discharged to the atmosphere. The kinetic energy so obtained is inherent in the resulting movement of the fluid.

Watering one's lawn will serve as an example of the above. When the faucet or valve is opened, pressurized water from the household's water supply system enters the hose and travels to the nozzle at the end of the hose. Typically, this nozzle contains a throttle valve which creates a passage for exit of the water that is narrower than the hose itself. A large pressure difference will then exist between the inlet and outlet ends of this passage. The outlet end of the exit passage will be at atmospheric pressure and the inlet end will be at nearly the base pressure of the water supply system, particularly if the hose is of significantly larger diameter than the exit passage of the nozzle. As a result of this large pressure difference in a short distance the velocity of the water will swiftly increase as it exits the nozzle. The water thus gains kinetic energy, as may be expected in this practical application of Bernoulli's law.

The kinetic energy of the water in the example given above is principally used in directing the water to various parts of one's lawn, garden, automobile, and other places or items to be watered or washed. Devices are known which use the kinetic energy of the water to power the movement of a sprinkler across a lawn. This kinetic energy could be used for other purposes.

A number of devices have been invented which convert some of the kinetic energy available from a pressurized fluid system into another, and more useful, form of energy. For example, U.S. Pat. No. 3,845,291 to Portyrata discloses a water-powered swimming pool light which comprises a turbine element located in the filtered water return line of a swimming pool. The turbine element powers a generator that in turn supplies electrical power to a lamp assembly mounted in the side of the pool. A permanent installation is contemplated in this patent.

U.S. Pat. No. 3,750,001 to McCloskey disclosed a remote, self-contained power supply apparatus for powering a pressurized-liquid distributing and disseminating system. A turbine element in a bypass line powers a generator which recharges electric storage means that in turn powers electrically operated valves in the main pipe. Again, a permanent installation is indicated.

U.S. Pat. No. 4,142,367 to Guisti discloses a domestic water pressure-flow powered generator system for connection to a domestic water system supply pipe. Whenever water is drawn from the system, a fluid motor is rotated which powers a generator. The generator recharges a bank of batteries or powers household appliances. Again, a fixed and permanent installation is disclosed.

U.S. Pat. No. 4,352,025 to Troyen discloses a system for generating electrical power that utilizes a hydroelectric generator located in the basement of a high-rise building and is powered by the flow of water in the clean wastewater line of the building. A fixed installation is disclosed.

The mechanisms for conversion of fluid flow energy described above all require permanent installations. Frequently, the mechanisms are bulky and immovable. None of these mechanisms are portable and may be installed as needed, where needed on an ad hoc basis. All convert fluid flow energy only into electrical energy. The present invention overcomes these limitations.

SUMMARY OF THE INVENTION

The present invention is a portable, self-contained power-conversion unit for attachment to a source of pressurized fluid. The invention comprises a body having a passage for transmission of fluid, an inlet end, and an outlet end, the passage joining the inlet end and the outlet end in order to permit flow of pressurized fluid from the inlet end to the outlet end, the inlet end being attachable to the source of pressurized fluid and the outlet end being at ambient atmospheric pressure, and an impeller rotatably mounted in the body and protruding into the passage so that the impeller is rotated by the flow of pressurized fluid through the passage.

The impeller may supply rotational energy to a generator and/or rotary tools. The generator may power illumination units or other electric appliances, including electric pumps. A chuck for releasable attachment of rotatable tools may be rotated by the impeller, so that a variety of rotary tools can be powered by the invention. Examples of such rotary tools include rotary saws, grinding wheels, rotary wire brushes, drill bits, centrifugal or positive displacement pumps, and the like.

The embodiment of the invention containing a generator is believed to be of particular value for emergency and field application, owing to its portability, simple construction, and easy installation. Electric power may be supplied at remote locations having a source of pressurized fluid, such as in a farmer's irrigated fields. The embodiment of the invention incorporating a generator can supply emergency electrical power in a power outage when electric power is not available but a source of pressurized fluid is. The invention may be used in nozzles for firemen's hoses, in which case a generator can power illumination units attached to the nozzle, so that firemen can see where they are pointing the nozzle. This would be especially valuable in dark or smoky conditions. The same concept may be used for garden hoses, so that homeowners can water their lawns at night. Watering lawns at night is preferred for saving water by reducing evaporative losses. The power-conversion unit of the invention may also be adapted to be powered by a source of pressurized gas, such as compressed air or liquified propane.

Thus, an object of the invention is to provide a portable, self-contained power-conversion unit that may be attached to a source of pressurized fluid and provide useful electrical or mechanical power when and where needed.

The more important features and objects of the invention have been outlined very broadly. Additional features and objects of the invention exist that will be set forth hereinafter in the detailed description of the preferred embodiment.

BRIEF DESCRIPTION OF THE DRAWINGS

FIG. 1 is a perspective view of the preferred embodiment of the invention;

FIG. 2 is a sectional view of the preferred embodiment of the invention, generally taken along section plane 2—2;

FIG. 3. is a plan view of the outlet end of the preferred embodiment of the invention;

FIG. 4 is a plan view of the top of the preferred embodiment of the invention, with a partial cut-away of the main body of the same to reveal the interior; and FIG. 5 is a sectional view of the preferred embodiment of the invention taken along section plane 5—5.

DETAILED DESCRIPTION OF THE PREFERRED EMBODIMENT

The preferred embodiment of the invention shown here is designed for use with a garden hose and or the like and may be attached to the usual threaded coupling on the end of such a hose. Thus, the pressurized fluid used in the preferred embodiment is water and its source is the household water supply system. The invention may also be incorporated into the nozzle of a fireman's hose, or designed for attachment to an agricultural irrigation system, among other applications. The invention includes all of these applications but is not limited thereto.

FIG. 1 in the drawings depicts a perspective view of the preferred embodiment of the invention. Body 10 is the overall housing of the preferred embodiment of the invention, which is formed of several parts as will be discussed in connection with FIGS. 2 and 4 below. The body has an inlet end 12 and an outlet end 14 and is provided with outward end threading 15 for attachment of extension tubes to narrow the stream of fluid emerging from the outlet end 14.

A part of body 10 is formed as impeller housing 11. Generator 16 is attached to impeller housing 11 on one side (not shown) thereof; the output of the generator is supplied to generator jack housing 18. Generator jack housing 18 has three jacks 19 which serve as attachment for plugs on power cables which lead to electrical appliances such as illumination units 26. On one side of impeller housing 11, on the left as seen in FIG. 1, is located chuck 20 which projects from guard 22. Rotary tools may be removably attached to chuck 20; the chuck is of the sort commonly found on electric hand-held drills. On the side of the body 10 which has inlet end 12 may be seen an on/off valve handle 24.

Illumination units 26 are located on either side of body 10, in front of generator 16 and impeller housing 11. The direction "front" or "forward" is defined in terms of the flow of pressurized fluid through the body 10, which proceeds from inlet end 12 to outlet end 14. Forward refers to the downstream direction; rearward refers to an upstream direction. These illumination units 26 are supplied with electrical power by illumination unit power cables 28 which end in plugs 29. Plugs 29 are intended to be inserted into jacks 19 to provide electrical power from generator 16 to illumination units 26.

Underneath body 10 may be seen a bipod which is shown in its retracted position 30A and, in phantom, in its extended position 30B. The bipod is attached to the body 10 by bipod swivel 32. The bipod supports the power-conversion unit at a slight angle with respect to the horizontal when the unit is placed on the ground or other surface.

Proceeding now to FIG. 2 in the drawings, which is a cross-section of the preferred embodiment of the invention taken generally along section plane 2—2 in FIG. 1, one may observe some of the detail of the interior of the preferred embodiment of the invention. Passage 38 is the generally cylindrical passage of varying diameter between inlet end 12 and outlet end 14 of body 10. Mounted on body 10 may be seen inlet housing 11 in which is located impeller 36. Impeller 36 mounts curved impeller blades 37. Impeller 36 is fastened to and rotates with impeller shaft 40. Thus, as pressurized fluid flows through passage 38 from inlet end 12 to outlet end 14, impeller 36 is rotated about impeller shaft 40 in a clockwise direction (as seen in FIG. 2) due to the impact of the pressurized fluid on impeller blades 37. Some of the linear kinetic energy of the pressurized fluid is converted thereby into rotational kinetic energy of impeller 36. Tests on a prototype of the invention reveal that the positioning of the impeller 36 within the passage 38 as shown in FIG. 2 does not significantly diminish the force and stream of the fluid emerging from the outlet end 14.

Generator jack housing 18 is mounted on the exterior of impeller housing 11. One of the jacks 19 is visible in FIG. 2. Electric potential (and current) is supplied to jacks 19 from the generator 16 by generator jack wires 17.

At inlet end 12 may be seen inlet end attachment threading 42 which comprises means that permit the power conversion unit to be attached to the threaded end of a garden hose or the like. Inlet end attachment threading 42 is formed in first cylinder 46, which, as with the rest of the components of body 10 described in detail below, may be made of polyvinyl chloride (PVC) plastic, aluminum, or the like. First cylinder 46 contains on/off valve sphere 25 which is formed integrally with on/off valve handle 24 and contains valve passage 25A. This valve permits the flow of pressurized fluid to be shut off completely.

Throttle valve 44 is threaded onto first cylinder 46. Throttle valve 44 may be any of a number of rotary throttle valves known to persons of ordinary skill in the art, such as those used on garden hoses to narrow or broaden the stream of water emerging from the end of the garden hose. Rotation of the throttle valve 44 about its axis, which lies generally along the axis of passage 38, will cause the throttle valve 44 to narrow or widen the diameter of its interior passage (not shown) through which the pressurized fluid flows.

First cylinder 46 is glued (PVC) or welded (metal) to first cylinder threaded sleeve 47. Threaded sleeve 47 permits attachment of first cylinder 46 to second cylinder 50. Between second cylinder 50 and first cylinder 46 is disposed washer 48 for the purpose of sealing. On the other end of second cylinder 50, the left end as seen in FIG. 2, is threading 52 which permits attachment of second cylinder 50 to third cylinder 54 by means of an attachment sleeve 56. Attachment sleeve 56 screws on to threading 52 and presses against flange 58 on third cylinder 54 so as to as wedge and join together second cylinder 50 and third cylinder 54. A second washer 60 permits sealing between second cylinder 50 and third cylinder 54.

FIG. 3 is a plan view of the outlet end of the preferred embodiment of the invention. One may observe the generally cylindrical generator 16 attached to impeller housing 11 on which is located generator jack housing 18. One of the jacks 19 is shown in the middle of generator jack housing 18; no plug is shown emplaced in middle jack 19. On either side of the generator jack housing 18 are additional jacks occupied by plugs 29 which in turn are electrically connected to illumination unit power cables 28 which supply electrical power to illumination units 26.

As seen from this end, the illumination units 26 display their lamp glasses 26A and also the mechanism by which they are attached to body 10. Illumination unit swivels 26B rotate about an axis at right angle to the axis of passage 38 and are made of a ferromagnetic metal. Swivels 26B fit into holes in third cylinder 54. Illumination unit magnets 26C are permanently attached to the sides of illumination units 26 and permit the illumination units 26 to be attached to swivels 26B through magnetic action. This permits a removable attachment of illumination units 26 to illumination unit swivels 26B. Therefore, the illumination units 26 may be removed from swivels 26B in order to be aimed in directions not permitted by rotation about swivels 26B. The illumination unit 26 may be rotated upwardly (26D, in phantom) and downwardly (26E, in phantom).

Looking at outlet end 14 in FIG. 3 one may observe passage 38 head on. Impeller 36 may be seen located within passage 38. On the left chuck 20 projects from impeller housing 11, with guard 22 covering the distance between chuck 20 and impeller housing 11.

FIG. 4 is a plan view of the top of the preferred embodiment of the invention with a partial cut-away of body 10 to reveal passage 38, as well as partial cutaways of the generator 16 and guard 22. This particular drawing permits one to observe the mechanism by which illumination units 26 are fastened to third cylinder 54. Swivel 26B is clearly seen to be rotatably attached to third cylinder 54. Magnets 26C permit removable attachment of illumination units 26 to swivels 26B.

As in FIG. 2, the impeller 36 may be seen to be directly in front of the throttle valve 44. The impeller 36 is attached to and rotates with shaft 40. Shaft 40 rotates about an axis at right angle to the direction of flow of the pressurized fluid through passage 38. Shaft 40 projects from the side of body 10 and is attached to chuck 20. Chuck 20 permits the removable attachment of rotary tools of various kinds to the end of shaft 40. Guard 22 protects operators from rotating impeller shaft 40. Bearings 41A and 41B both seal pressurized fluid inside body 10 and act as bearings for impeller shaft 40. On the other side of impeller 46 from chuck 20 may be seen direct current generator 16 which is of a sort well known to the art, equipped with an armature 39, permanent magnets (not shown), and commutator brushes (not shown). Generator jack power wires 17, which electrically connect the generator 16 to jacks 19, are partially visible in the cut-away of impeller housing 11.

On/off valve handle 24 may be seen on the right, as well as on/off valve sphere 25. This valve is in the open position permitting passage of pressurized fluids through it en route to throttle valve 44. Inlet end attachment threading 42 is clearly seen. FIG. 4 shows the means by which the operator can adjust the flow of pressurized fluid through throttle valve 44. This consists of a throttle valve adjustment member 64 which is welded to throttle valve 44. At the other end of throttle valve adjustment member is handle 62 which projects from body 10 through opening 66.

As is more clearly seen in FIG. 5, the operator may turn throttle valve adjustment member handle 62 (shown in phantom) in order to rotate throttle valve 44 and thus adjust the narrowness (and speed) of the stream of pressurized fluid (not shown) emerging from throttle valve 44 and striking the impeller 36. This affects the speed of rotation of impeller 36. The throttle valve adjustment member projects through throttle valve adjustment member opening 66 formed in flange 47.

The preferred embodiment of the invention is operated as follows. First, the power-conversion unit is attached to a source of pressurized fluid, such as a garden hose, by threading the hose and the unit together via inlet end attachment threading 42. The power-conversion unit is small and light in weight. Thus, it is easily portable and can be held and directed much as one would hold and direct an ordinary nozzle for a garden hose. Other applications, such as for a fireman's hose, may require larger and heavier versions of the power-conversion unit but would still be portable.

On/off valve handle 24 is rotated to permit passage of pressurized fluid through the on/off valve and onward into the throttle valve 44. Throttle valve adjustment member handle 62 is turned by the operator to produce the desired narrowness of pressurized fluid stream emerging from the throttle valve 44, which in turn controls the rate of rotation of impeller 36. As impeller 36 is rotated the armature in the generator is likewise rotated and a potential difference created thereby. This potential difference is supplied to jacks 19 by means of wires 17. If desired, the plugs 29 of illumination units 26 may be inserted in jacks 19 to power illumination units 26 and provide light. In their normal position, the illumination units 26 are fastened by magnets 26C to swivels 26B pointing the illumination units in a generally forward direction to illuminate the subject ahead of the unit and its operator. Thus, the target of the pressurized fluid stream from the outlet end 14 of the unit will be made visible at night or in poor lighting conditions. If desired, other electrical appliances may be powered by plugs inserted in jacks 19. Example of such appliances are transistor radios and battery charging units. Alternatively, or in addition, a rotary tool such as a drill bit, a rotary sander, a grinding wheel, a rotary saw, a rotary brush, a centrifugal pump, or a positive displacement pump may be inserted and locked into chuck 20 to perform the various functions of these rotary tools.

Although the preferred embodiment of the invention contains both the generator 16 and the chuck 20 attached to shaft 40 of the impeller 36, one or the other may be eliminated as desired. The particular form of the impeller and its blades, and the positioning of its axis of rotation may be varied without departing from the spirit and scope of the invention. For example, the blades of the impeller could be straight and not curved. The impeller could be shaped as a turbine or screw and made to rotate about an axis parallel to the axis of passage 38, which may require some gearing to transfer rotational power outside body 10. Many other variations are possible.

Thus, a portable, self-contained power-conversion unit has been provided. Those skilled in the art will appreciate that the conception upon which this disclosure is based may be used as a basis for the designing of other structures, for carrying out the several purposes of the invention. The claims, therefore, should be regarded as including such equivalent constructions as do not depart from the spirit and scope of the invention, which is intended to be defined by the appended claims.

What is claimed is:

1. A portable, self-contained power-conversion unit, for attachment to a source of pressurized fluid, comprising:
   (a) a body having a passage for transmission of fluid, an inlet end, and an outlet end, the passage joining the inlet end and the outlet end in order to permit flow of pressurized fluid from the inlet end to the outlet end, the inlet end being attachable to the source of pressurized fluid and the outlet end being at ambient atmospheric pressure;
   (b) an impeller rotatably mounted in the body and protruding into the passage so that the impeller is rotated by the flow of pressurized fluid through the passage; and
   (c) a generator mounted on and supported by the body and attached to the impeller so that rotation of the impeller causes rotation of an armature in the generator in order to generate electric power.

2. The power-conversion unit according to claim 1 in which a rotary tool projecting from the body is attached to the impeller so that rotation of the impeller rotates the rotary tool.

3. The power-conversion unit according to claim 1 further comprising a plurality of illumination units attached to and supported by the body and electrically connected in circuit with the generator to be supplied with electrical power by the generator.

4. The power-conversion unit according to claim 3 in which the plurality of illumination units are detachable from the body.

5. A portable, self-contained power-conversion unit, for attachment to a source of pressurized fluid, comprising:
   (a) a body having a passage for transmission of fluid, an inlet end, and an outlet end, the passage joining the inlet end and the outlet end in order to permit flow of pressurized fluid from the inlet end to the outlet end, the inlet end being attachable to the source of pressurized fluid and the outlet end being at ambient atmospheric pressure;
   (b) an impeller rotatably mounted in the body and protruding into the passage so that the impeller is rotated by the flow of pressurized fluid through the passage; and
   (c) a rotary tool projecting from the body and attached to the impeller so that rotation of the impeller rotates the rotary tool.

6. The power-conversion unit according to claim 5 further comprising a plurality of generator jacks mounted on the body for electrical attachment of a plurality of electric appliances to be powered by the generator.

7. The power-conversion unit of claim 6 in which one or more of the electric appliances are illumination units.

8. The power-conversion unit according to claim 1, 5 or 2 further comprising a chuck for releasably engaging rotating tools, the chuck being rotatably attached to the body and attached to the impeller so that rotation of the impeller causes rotation of the chuck.

9. A portable, self-contained power-conversion unit, attachable to a source of pressurized fluid, comprising:
   (a) a body having a passage for transmission of fluid from the source of pressurized fluid to ambient atmospheric pressure, an inlet end, and an outlet end, the passage joining the inlet end and the outlet end, the inlet end including connecting means for removable attachment of the body to the source of pressurized fluid;
   (b) an impeller having a shaft, the impeller being mounted in the body rotatable about the shaft and protruding into the passage so that the impeller intercepts and is rotated by the flow of pressurized fluid through the passage; and
   (c) a throttle valve mounted in the passage between the inlet end and the impeller, the throttle valve controlling the velocity of the fluid intercepted by the impeller.

10. The power-conversion unit according to claim 9 further comprising a generator having an armature, the armature being attached to a first end of the shaft of the impeller so that rotation of the impeller causes rotation of the armature.

11. The power-conversion unit according to claims 9 or 10, further comprising a chuck for releasably engaging rotary tools, the chuck being rotatably mounted on the body, and engaged to the impeller so that rotation of the impeller rotates the chuck.

12. The power-conversion unit according to claim 11 in which the chuck is mounted on a second end of the shaft of the impeller.

13. The power-conversion unit according to claim 10 further comprising a plurality of illumination units attached to the body and in circuit with the generator in order to be powered thereby, the illumination units being attached to the body and capable of providing illumination in a direction generally the same as that taken by fluid leaving the outlet end of the body.

14. The power-conversion unit according to claim 13 in which the illumination units are releasably attachable to the body.

15. A portable, self-contained power-conversion unit, attachable to a source of pressurized fluid, comprising:
   (a) a body having a passage joining an inlet end and an outlet end of the body, the passage allowing the passage of pressurized fluid from the inlet end to the outlend end, the inlet end having attachment means for joining the source of pressurized fluid to the body;
   (b) an impeller having blades and a shaft, the impeller being mounted in the body and rotatable about the shaft, the shaft being at subsequently right angles to the direction of passage of the pressurized fluid through the passage;
   (c) a generator attached to the shaft and mounted on a first side of the body;
   (d) a chuck attached to the shaft and mounted on a second side of the body; and
   (e) a throttle valve located within the body between the inlet end and the impeller and controlling the diameter of the passage at one point or points, the throttle valve being rotatable within the body so as to control the velocity of fluid emerging from the throttle and striking the impeller.

16. The power-conversion unit of claim 15 further comprising illumination units removably attached to the body and electrically powered by the generator.

17. The power-conversion unit of claim 16 further comprising a bipod mounted on the body for supporting the power-conversion unit.

* * * * *